(12) United States Patent
Watanabe

(10) Patent No.: US 7,222,688 B2
(45) Date of Patent: May 29, 2007

(54) CAB SLIDING DEVICE OF INDUSTRIAL MACHINE

(75) Inventor: Nobuyuki Watanabe, Sagamihara (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 0 days.

(21) Appl. No.: 10/570,492

(22) PCT Filed: Sep. 17, 2004

(86) PCT No.: PCT/JP2004/013614

§ 371 (c)(1),
(2), (4) Date: Mar. 3, 2006

(87) PCT Pub. No.: WO2005/030561

PCT Pub. Date: Apr. 7, 2005

(65) Prior Publication Data
US 2006/0285951 A1 Dec. 21, 2006

(30) Foreign Application Priority Data
Sep. 26, 2003 (JP) .............................. 2003-335197

(51) Int. Cl.
*B62D 33/06* (2006.01)
(52) U.S. Cl. ................................ 180/89.13; 296/190.04
(58) Field of Classification Search ............. 180/89.13, 180/89.1, 89.18, 89.12; 296/190.04; 280/149.2
See application file for complete search history.

(56) References Cited

U.S. PATENT DOCUMENTS 3,944,277 A * 3/1976 Cyphert ...................... 296/68

FOREIGN PATENT DOCUMENTS

| JP | 63-137023 A | 6/1988 |
| JP | 11-181832 A | 7/1999 |
| JP | 2003-237638 A | 8/2003 |

* cited by examiner

*Primary Examiner*—Paul N. Dickson
*Assistant Examiner*—Robert A. Coker
(74) *Attorney, Agent, or Firm*—Birch, Stewart, Kolasch & Birch, LLP

(57) ABSTRACT

A cab sliding device of an industrial machine, in which a slide base can be inserted into and withdrawn from rails from above the rails, whereby the number of man-hours for assembly can be decreased, and the ease of maintenance can be increased, is provided. For this purpose, in an industrial machine having a cab (11) slidably installed via a slide base (20) on a pair of rails (10) laid on a frame (4), the rails are nearly channel-shaped in cross section, and are provided to have concave space portions (10a) opposed to each other, the slide base has a plurality of rollers (21) annexed to opposite side surface portions thereof, the rollers being rollable inside the concave space portions of the rails, upper surfaces of the rails are provided with openings (12) which permit incoming and outgoing of the roller portions, and the slide base can be inserted into and withdrawn from the rails via the openings from above the rails.

7 Claims, 3 Drawing Sheets

CAB SLIDING DEVICE OF INDUSTRIAL MACHINE

TECHNICAL FIELD

This invention relates to a cab sliding device of an industrial machine, and relates to a cab sliding device preferred for use in a heavy duty cargo handling vehicle, such as a reach stacker, which has a cab slidable by chain drive.

BACKGROUND ART

In a heavy duty cargo handling vehicle, such as a reach stacker, a cab is generally installed on a frame so as to be slidable in a lateral direction or a longitudinal direction in order to ensure visibility. In this case, the cab is secured onto a slide base, and a pair of rails of nearly channel-shaped cross section are laid on the frame, with concave space portions of the rails being opposed to each other. A plurality of rollers annexed to opposite side surface portions of the slide base are provided so as to be rollable inside the concave space portions of these rails.

DISCLOSURE OF THE INVENTION

Problems to be Solved by the Invention

In inserting the slide base into, and withdrawing it from, the rails on the frame during assembly and maintenance, its insertion and withdrawal are usually performed at end portions of the rails, with the slide base being suspended by a crane or the like. However, in inserting the slide base, which is a heavy object, from a lateral direction, it is very difficult to position the slide base. If a slide motor or the like for driving a chain or a belt is disposed at the end portions of the rails, moreover, the insertion and withdrawal operations cannot be performed unless the slide motor or the like is detached. These inconveniences pose the problem of very poor workability.

It is, therefore, an object of the present invention to provide a cab sliding device of an industrial machine, in which a slide base can be inserted into and withdrawn from rails from above the rails, whereby the number of man-hours for assembly can be decreased, and the ease of maintenance can be increased.

Means for Solving the Problems

A cab sliding device of an industrial machine according to the present invention, intended for attaining the above object, is a cab sliding device of an industrial machine having a cab slidably installed via a slide base on a pair of rails laid on a frame, characterized in that the rails are nearly channel-shaped in cross section, and are provided to have concave space portions opposed to each other, the slide base has a plurality of rollers annexed to opposite side surface portions thereof, the rollers being rollable inside the concave space portions of the rails, upper surfaces of the rails are provided with openings which permit incoming and outgoing of the roller portions, and the slide base can be inserted into and withdrawn from the rails via the openings from above the rails.

Preferably, the openings are provided in proximity to ends of the rails, and are closed with blocks, which concurrently serve as stoppers in a direction of slide, after the slide base is inserted.

Preferably, two of the openings are provided at a spacing equal to or smaller than a spacing between two of the rollers provided in the side surface portion of the slide base.

Preferably, the cab is installed on the frame of a reach stacker so as to be slidable in a longitudinal direction by chain or belt drive.

Effects of the Invention

According to the present invention with the above features, the slide base can be positioned by the crane or the like relatively easily and can be inserted into and withdrawn from the rails, with the drive motor for chain or belt drive, etc. being set at the end portion of the rail. Thus, the number of man-hours for assembly can be decreased, and the ease of maintenance can be increased.

DESCRIPTION OF THE REFERENCE NUMERALS

1 front wheel, 2 rear wheel, 3 engine, 4 frame, 5 tower, 6 telescopic boom, 7 spreader, 8 tilt cylinder, 9 telescopic cylinder, 10 rail, 11 cab, 12 opening, 13 block, 14 bolt, 15 L-shaped bracket, 16a drive pulley, 16b driven pulley, 17 belt, 18 drive motor, 20 slide base, 21 roller.

BEST MODE FOR CARRYING OUT THE INVENTION

A cab sliding device of an industrial machine according to the present invention will now be described in detail by embodiments with reference to the accompanying drawings.

Embodiment 1

Figure 1:
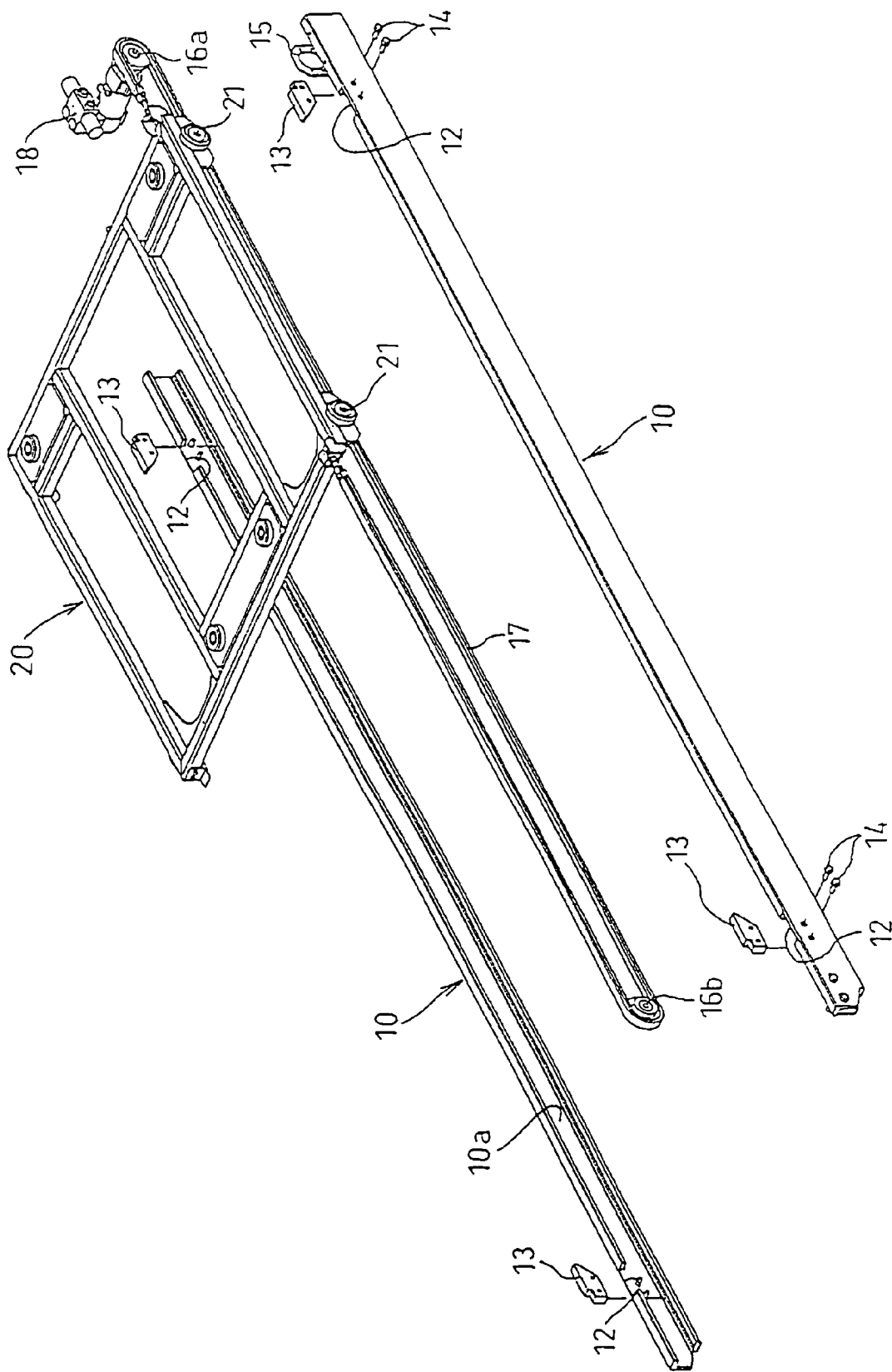
[FIG. 1] An exploded perspective view of a cab sliding device of a reach stacker showing Embodiment 1 of the present invention.
Figure 2:
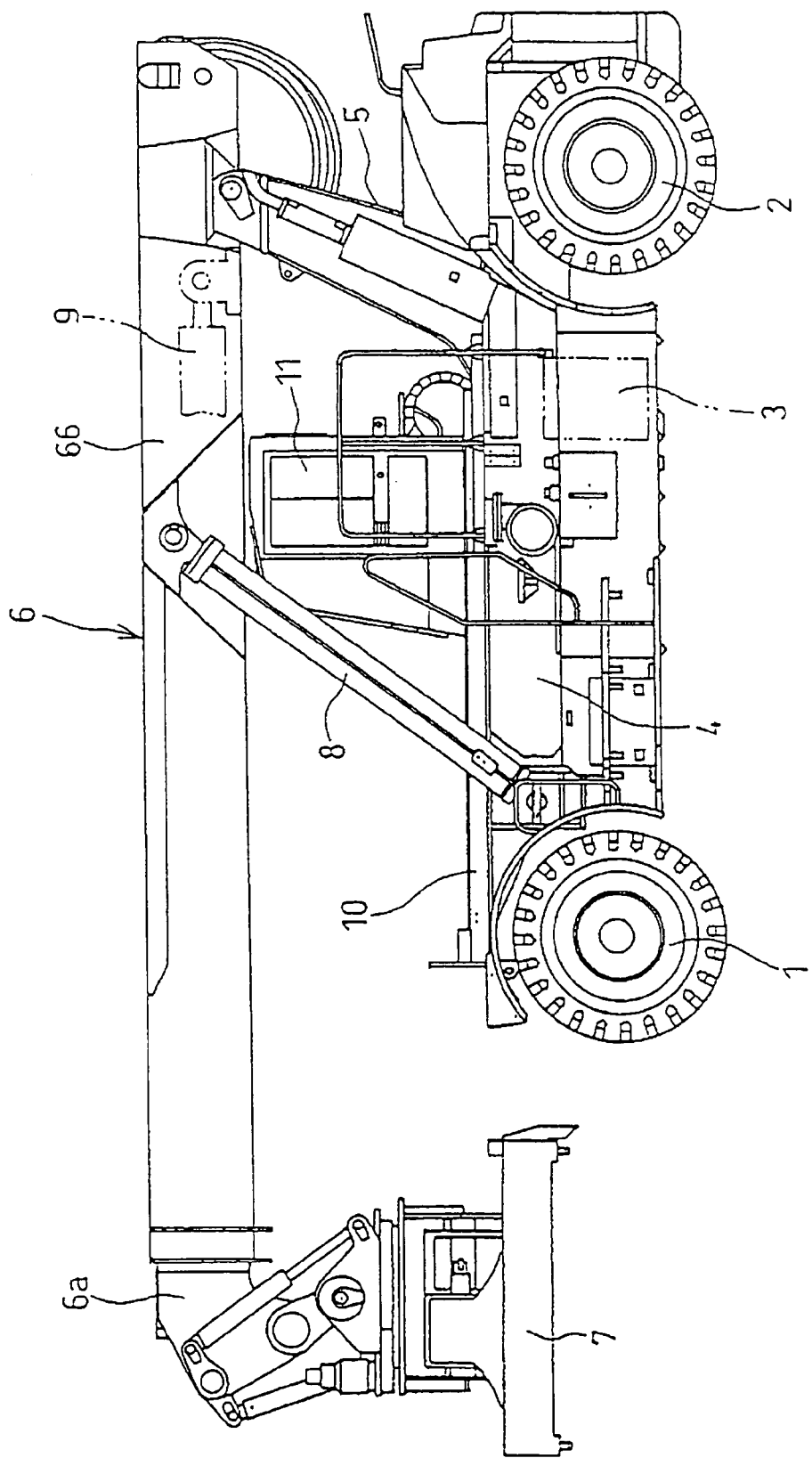
[FIG. 2] A side view of the reach stacker.

FIG. 1 is an exploded perspective view of a cab sliding device of a reach stacker showing Embodiment 1 of the present invention. FIG. 2 is a side view of the reach stacker.

As shown in FIG. 2, a reach stacker has a telescopic boom 6 supported on a frame 4 via a tower 5 so as to be raisable and lowerable, the frame 4 having a pair of front wheels 1 and rear wheels 2 and being cable of running by the action of an engine 3. A spreader 7, which can hold a long container or the like, is suspended from the front end of an inner boom 6a of the telescopic boom 6.

The telescopic boom 6 makes rising and lowering motions by the action of two tilt cylinders 8 provided as a pair between the frame 4 and an outer boom 6b, and also makes expanding and contracting motions by the action of a single telescopic cylinder 9 provided between the inner boom 6a and the outer boom 6b. A cab 11 is provided on the frame 4 via a pair of (i.e., right and left) rails 10 so as to be slidable in a longitudinal direction.

As shown in FIG. 1, the cab 11 is secured onto a slide base 20 in the shape of a quadrilateral frame, and the pair of rails 10 of nearly channel-shaped cross section are laid on the frame 4, with concave space portions 10a of the rails 10 being opposed to each other. Two (i.e., front and rear) rollers 21 annexed to each of opposite side surface portions of the slide base 20 are provided so as to be rollable inside the concave space portions 10a of these rails 10.

An upper surface of each of the rails 10 is provided with openings (notches) 12, which are located near the ends of each rail 10, such that one such roller 21 can enter and leave the concave space portion 10a through one such opening 12. The slide base 20 can be inserted into and withdrawn from the rails 10 through these openings 12 from above the rails 10.

Each of the openings 12 is closed with a wedge-shaped block 13, which concurrently serves as a stopper in the direction of slide, after the slide base 20 is inserted. These blocks 13 are fixed to the side surfaces of the rails 10 by bolts 14.

An L-shaped bracket 15 is attached to an end portion of one of the rails 10, and a drive pulley 16a and a hydraulic drive motor 18 are supported by the L-shaped bracket 15. A driven pulley 16b is attached to the other end portion of this rail 10. A belt 17, which is looped between the drive pulley 16a and the driven pulley 16b, is partly divided, and one end of the belt 17 is detachably connected to the front surface of the slide base 20, while the other end of the belt 17 is detachably connected to the rear surface of the slide base 20.

Because of the above-described features, when the slide base 20 is to be inserted into the rails 10 on the frame 4 during assembly and maintenance, the first step is to position the front two rollers 21 at the openings 12 located near the rear ends of the rails 10 while suspending the slide base 20 by a crane or the like. While so positioned, these rollers 21 are inserted into the openings 12 from above.

Then, the slide base 20 is moved forward. In accordance with this movement, the front two rollers 21 of the slide base 20 roll inside the concave space portions 10a of the rails 10, while the rear two rollers 21 roll on the upper surfaces of the rails 10.

When the rear two rollers 21 arrive at the openings 12, these two rollers 21 are also inserted into the openings 12. Then, these two rollers 21 become rollable inside the concave space portions 10a together with the front two rollers 21, whereby insertion work for the slide base 20 is completed.

Then, the openings 12 are closed with the blocks 13 concurrently serving as stoppers. On the other hand, the front openings 12 of the rails 10 may be closed beforehand with the blocks 13 concurrently serving as stoppers. The belt 17 is looped between the sprockets 16a and 16b assembled beforehand to the rails 10, and one end of the belt 17 is connected to the front surface of the slide base 20, while the other end of the belt 17 is connected to the rear surface of the slide base 20.

Finally, the cab 11 is secured onto the slide base 20. Of course, the slide base 20 with the cab 11 secured thereto before hand may be subjected to the work for insertion into the rails 10.

In the foregoing manner, according to the present embodiment, the slide base 20 can be positioned by the crane or the like relatively easily and can be inserted into the rails 10, with the drive motor 18 for belt drive, etc. being set at the end portion of the rail 10. Thus, the number of man-hours for assembly can be decreased, and the ease of maintenance can be increased.

Moreover, the openings 12 are closed with the blocks 13, so that the accidental escape of the roller 21 is prevented. Furthermore, the blocks 13 concurrently serve as stoppers in the direction of slide, thus contributing to a decrease in the number of components. Besides, the openings 12 are formed in the vicinity of the front ends of the rails 10. Thus, the work for insertion of the slide base 20 can also be performed from forward of the reach stacker through these openings 12.

In the above-described embodiment, the insertion work for the slide base 20 is explained. The work of withdrawing the slide base 20 is self-evidently the reverse of the above-mentioned insertion work. Thus, an explanation for the withdrawal work is omitted.

Embodiment 2

Figure 3:
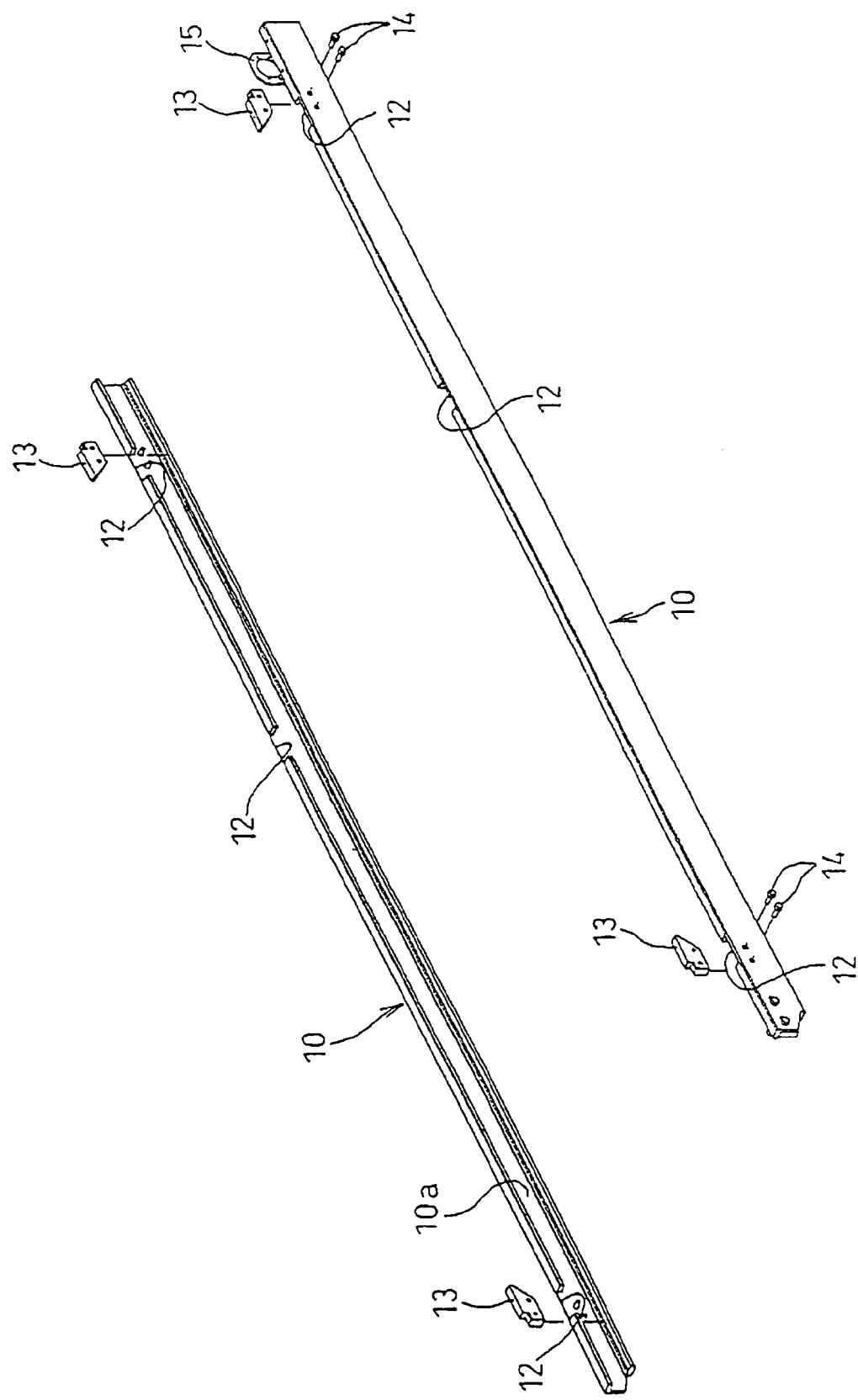
[FIG. 3] An exploded perspective view of essential parts of a cab sliding device of a reach stacker showing Embodiment 2 of the present invention.

FIG. 3 is an exploded perspective view of essential parts of a cab sliding device of a reach stacker showing Embodiment 2 of the present invention.

This is an embodiment in which two of the openings 12 in Embodiment 1 are provided on a rear-end side (optionally, a front-end side) of each of the rails 10 at a spacing equal to or smaller than the spacing between the two (i.e., front and rear) rollers 21 provided on each of the opposite side surfaces of the slide base 20.

According to this embodiment, if the openings 12 are provided at the same spacing as the spacing between the rollers 21, the two (front and rear) rollers 21 of the slide base 20 can be simultaneously inserted into the concave space portion 10a of the rail 10 via the two openings 12. If the openings 12 are provided at a slightly smaller spacing than the spacing between the rollers 21, the rear roller 21 can be promptly inserted into the concave space portion 10a, without being rolled over a long distance on the upper surface of the rail 10, in the same insertion work as done in Embodiment 1. Thus, the insertion (or withdrawal) work can be expedited.

In the above embodiments, the belt drive for the slide base 20 may be replaced by other wrapping connector driving gear, such as a chain drive. Moreover, the blocks 13 need not concurrently serve as stoppers, and stoppers may be provided separately. In this case, the openings 12 may be provided at any positions in a lengthwise direction of the upper surface of the rail 10. Furthermore, the cab 11 and the slide base 20 may be formed integrally.

INDUSTRIAL APPLICABILITY

The cab sliding device of an industrial machine according to the present invention can be applied not only to a heavy duty cargo-handling vehicle such as a reach stacker, but also to an industrial (transport) machine such as a crane.

The invention claimed is:

1. A cab sliding device of an industrial machine comprising a cab slidably installed via a slide base on a pair of rails laid on a frame, wherein
    said rails are channel-shaped in cross section, and are provided to have concave space portions opposed to each other,
    said slide base has a plurality of rollers annexed to opposite side surface portions thereof, said rollers being rollable inside said concave space portions of said rails,
    upper surfaces of said rails are provided with openings which permit incoming and outgoing of said roller portions, and
    said slide base can be inserted into and withdrawn from said rails via said openings from above said rails.

2. The cab sliding device of said industrial machine according to claim 1, wherein said openings are provided in proximity to ends of said rails, and are closed with blocks, which concurrently serve as stoppers in a direction of slide, after said slide base is inserted.

3. The cab sliding device of said industrial machine according to claim 1, wherein two of said openings are provided at a spacing equal to or smaller than a spacing between two of said rollers provided in said side surface portion of said slide base.

4. The cab sliding device of said industrial machine according to claim 1, wherein said cab is installed on said frame of a reach stacker so as to be slidable in a longitudinal direction by chain or belt drive.

5. The cab sliding device of said industrial machine according to claim 2, wherein two of said openings are provided at a spacing equal to or smaller than a spacing between two of said side surface portion of said slide base.

6. The cab sliding device of said industrial machine according to claim 2, wherein said cab is installed on said frame of a reach stacker so as to be slidable in a longitudinal direction by chain or belt drive.

7. The cab sliding device of said industrial machine according to claim 3, wherein said cab is installed on said frame of a reach stacker so as to be slidable in a longitudinal direction by chain or belt drive.

* * * * *